UNITED STATES PATENT OFFICE.

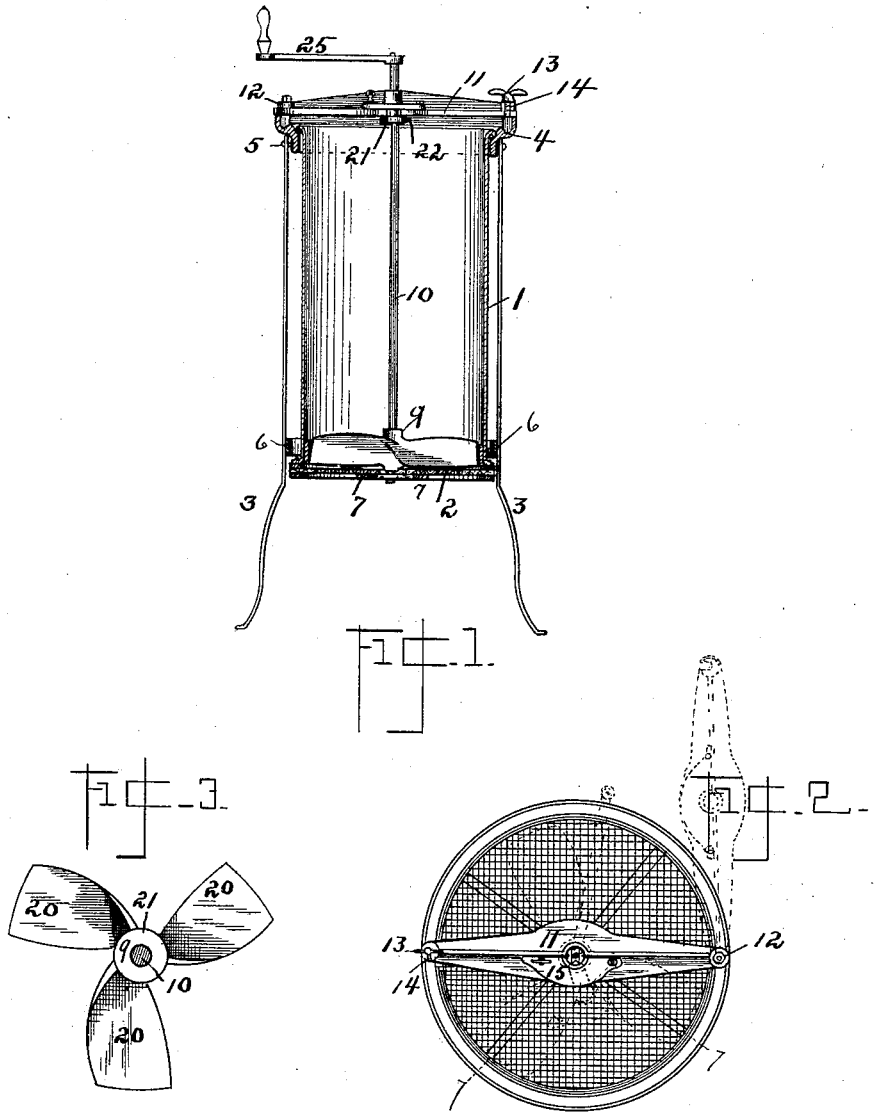

PHILLIP PATROLI, OF DAYTON, OHIO.

COLANDER FOR MASHING VEGETABLES.

SPECIFICATION forming part of Letters Patent No. 482,982, dated September 20, 1892.

Application filed May 2, 1891. Serial No. 391,410. (No model.)

*To all whom it may concern:*

Be it known that I, PHILLIP PATROLI, residing at Dayton, in the State of Ohio, have invented certain new and useful Improvements in Colanders for Mashing Vegetables, of which the following is a specification, reference being had therein to the accompanying drawings.

This invention relates to colanders or comminuters which are operated mechanically.

The object of the invention is to produce a mechanical colander, which shall operate with great rapidity to pulverize or comminute vegetables, such as cooked potatoes, fruits, and the like.

Figure 1 is a vertical section of the entire device. Fig. 2 is a plan of the same, and Fig. 3 a plan of the screw or propeller.

The numeral 1 indicates a cylindrical vessel, preferably of light sheet metal, and having a perforated or reticulated bottom 2. The vessel is preferably supported on light legs 3, which extend to the top of the vessel and are attached to the collar 4 by rivets 5 or otherwise. The lower edge of the vessel 1 is preferably strengthened by a band 6, and cross-bars 7 7 extend across the bottom of the vessel a little below the reticulated bottom 2. The bottom 2 has a central perforation and below this perforation the bars 7 7 have a box or bearing for a shaft 10, which is thus supported centrally in the vessel 1. The upper end of the shaft 10 has a bearing in a cross-piece 11, which extends from side to side of the strengthening-collar 4. This cross-piece 11 is pivoted to the collar 4 at one side, as shown at 12, and is held on the opposite side by a thumb-screw 13, which enters a slot 14 in the cross-piece. The cross-bar 11 has an opening at the side of the shaft-bearing, a swinging piece 15 being pivoted to the cross-bar and held in closed position by a set-screw in the same manner that the cross-bar itself is held on the rim. The upper bearing of the shaft 10 may be opened and the cross-bar 11 swung aside without moving shaft 10. When so released, shaft 10 and its attachments may be lifted out of the vessel 1.

The shaft 10 has a series of arms 20, arranged with inclines after the manner of a screw-propeller, and these arms extend very nearly across the vessel 1. The arms are connected to the hub 9, which hub is firmly secured to the shaft 10 near the lower end of said shaft, so that there is but little space between the lower edges of the arms 20 and the reticulated or perforated bottom 2. The leading edges of the arms 20 are above said lower or following edges, and each arm curves downwardly and backwardly to the lower or following edge. When the shaft is rotated forwardly, the leading edges of the arms ride over the potatoes or other vegetables which are in the vessel and force them down, gradually crushing them through the reticulated bottom.

The shaft 10 is held down by a collar or ring 21, which is held to said shaft by a set-screw 22 a little below the upper bearing. This ring may be adjusted lengthwise on the shaft 10 so as to allow said shaft to rise a little in its bearings, and the arms 20 will then be free to rise slightly from the bottom 2. In this manner the comminution of the vegetables may be varied somewhat.

The shaft 10 is turned by means of a crank 25 or other suitable handle.

The adjustable upper bearing permits the ready removal of the shaft and arms for cleaning the interior of the colander and also for adjusting the ring 21 when desirable. The shaft 10 extends far enough into its lower bearing to permit all the longitudinal movement necessary for said shaft. The ring 21 thus forms a thrust-bearing for shaft 10.

If the movement of the propeller be reversed, it will not act to crush the vegetables through the bottom of the vessel, but will lift them up, thus preventing clogging and clearing the perforations in the bottom of the vessel to some extent.

This device is specially intended for the use of hotels and restaurants, where large quantities of vegetables are mashed for the table.

What I claim is—

1. The cylindrical colander having a perforate bottom and supporting-legs, the central shaft having propeller-arms near said bottom and supported in cross-bars below said bottom and in the top cross-piece, which is pivoted to one side of the colander to swing laterally and provided with a set-screw for securing the other end of said bar, said cross-piece having a swinging piece to complete the bearing-box, all the parts combined and arranged substantially as described.

2. The colander described, having cylindrical body and legs extending from near the top of the body to a distance below the bottom thereof, said body having a reticulated bottom and cross-bars below the same, a central shaft having arms with inclined surfaces just above the reticulated bottom, and a top cross-piece having a bearing-box for the said shaft, said cross-piece pivoted to the body at one end so as to swing sidewise and having a fastening device to connect the other end of the bar to the body, substantially as described.

In testimony whereof I affix my signature in presence of two witnesses.

PHILLIP PATROLI.

Witnesses:
JOSEPH WELNA,
MARR A. FOOTE.